United States Patent
Bartsch et al.

(10) Patent No.: US 7,140,176 B2
(45) Date of Patent: Nov. 28, 2006

(54) PARTICULATE FILTER REGENERATION METHOD FOR A MOTOR VEHICLE

(75) Inventors: Arno Bartsch, Lardy (FR); Antoine Baux, Paris (FR); Georges Hekimian, Levallois (FR)

(73) Assignee: Renault s.a.s., Boulogne Billancourt (FR)

(*) Notice: Subject to any disclaimer, the term of this patent is extended or adjusted under 35 U.S.C. 154(b) by 0 days.

(21) Appl. No.: 10/505,459

(22) PCT Filed: Mar. 10, 2003

(86) PCT No.: PCT/FR03/00767

§ 371 (c)(1),
(2), (4) Date: May 27, 2005

(87) PCT Pub. No.: WO03/076775

PCT Pub. Date: Sep. 18, 2003

(65) Prior Publication Data

US 2005/0235633 A1    Oct. 27, 2005

(30) Foreign Application Priority Data

Mar. 8, 2002 (FR) .................. 02 02961

(51) Int. Cl.
*F01N 3/00* (2006.01)

(52) U.S. Cl. ............... 60/276; 60/274; 60/295; 60/297; 60/311

(58) Field of Classification Search ........... 60/274, 60/276, 295, 297, 311
See application file for complete search history.

(56) References Cited

U.S. PATENT DOCUMENTS

| | | | | |
|---|---|---|---|---|
| 5,024,054 A | * | 6/1991 | Barris et al. | 60/274 |
| 5,052,178 A | * | 10/1991 | Clerc et al. | 60/274 |
| 5,511,413 A | * | 4/1996 | Pfister et al. | 73/118.1 |
| 6,405,528 B1 | * | 6/2002 | Christen et al. | 60/295 |

FOREIGN PATENT DOCUMENTS

| | | |
|---|---|---|
| DE | 199 33 988 | 1/2000 |
| FR | 2 808 559 | 11/2001 |
| JP | 08 284643 | 10/1996 |

* cited by examiner

*Primary Examiner*—Thomas Denion
*Assistant Examiner*—Diem Tran
(74) *Attorney, Agent, or Firm*—Oblon, Spivak, McClelland, Maier & Neustadt, P.C.

(57) ABSTRACT

A method and device for regeneration of a particulate filter situated on an exhaust line of an engine. The method determines a soot burden on the filter based on knowledge of a differential pressure $\Delta P$ at ends of the filter and triggers combustion of the soot when the burden reaches a predetermined level. A pressure Pdownstream downstream from the filter is modeled without use of a pressure sensor and Pupstream is determined without use of a pressure sensor using the relationship Pupstream=$\Delta P$+Pdownstream. The burden is determined by the relationship $\Delta P$=f (Qvol, mass of soot), with Qvol=K×(Qair+$\rho$fuel×Qcarb)×N×Tupstream/Pupstream, where K is a constant, Qair denotes a mass flow of air, $\rho$fuel denotes a density of the fuel, Qcarb denotes a volumetric quantity of fuel, N denotes an rpm of the engine, and Tupstream denotes an absolute temperature measured upstream from the filter.

6 Claims, 1 Drawing Sheet

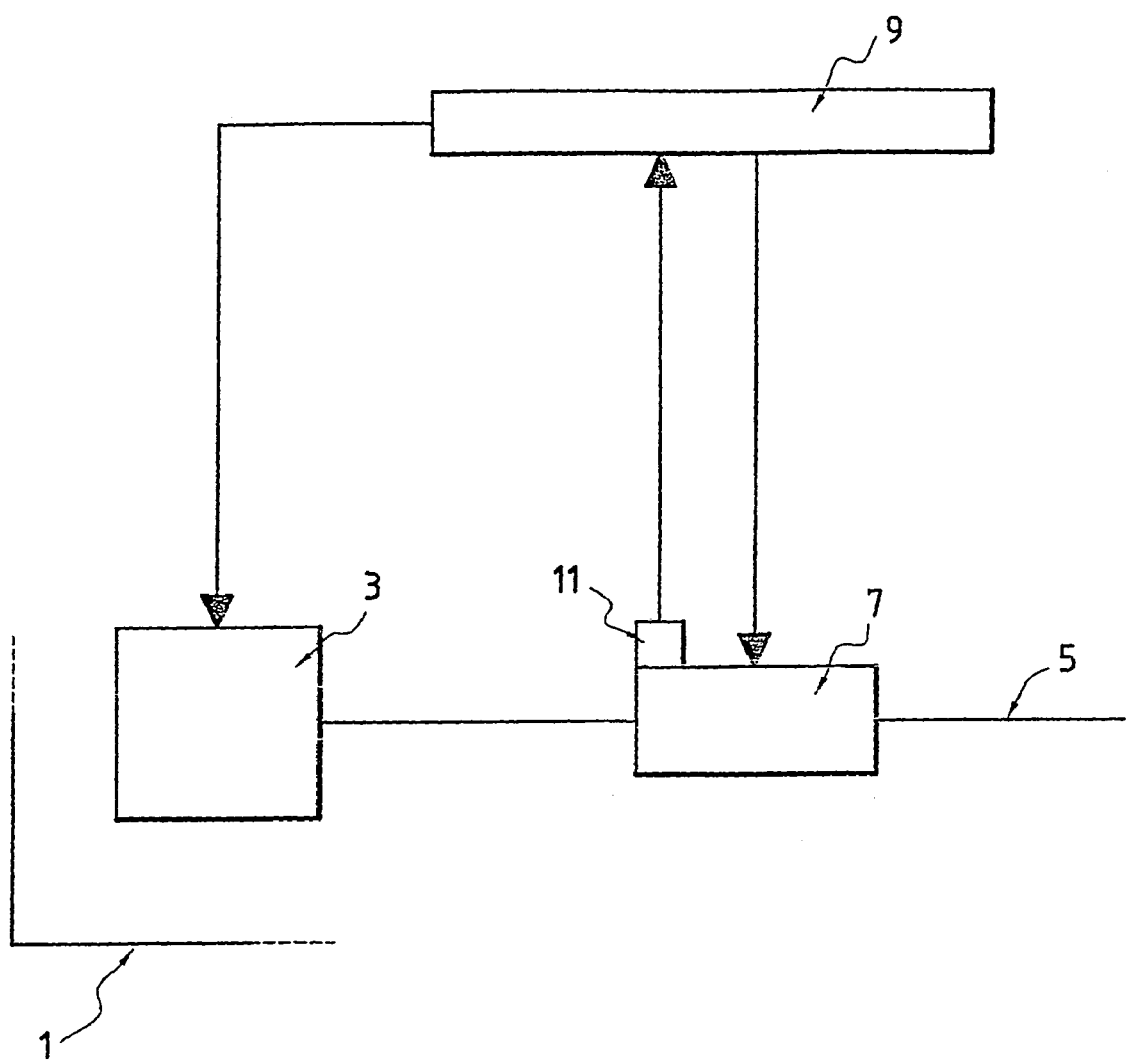

PARTICULATE FILTER REGENERATION METHOD FOR A MOTOR VEHICLE

BACKGROUND OF THE INVENTION

1. Field of the Invention

The present invention relates to a method for regeneration of a particulate filter for a motor vehicle and to a device for use of such a method.

2. Discussion of the Background

As is known in itself, the exhaust systems of diesel-engine vehicles are equipped with particulate filters for the purpose of suppressing discharge of soot particles into the environment.

Regeneration operations must be performed periodically in order to prevent fouling of the particulate filter and the poor engine function that can result therefrom.

The regeneration method is based on knowledge of different parameters, especially on knowledge of the differential pressure at the ends of the particulate filter and of the pressure upstream from this filter.

Thus it is necessary to provide both a differential pressure sensor and an upstream pressure sensor.

The use of two sensors is complex and expensive.

SUMMARY OF THE INVENTION

The object of the present invention is to eliminate this disadvantage.

This object of the invention is achieved with a method for regeneration of a particulate filter situated on an exhaust line of the engine of a motor vehicle, the method being of the type in which the burden of the said filter is evaluated with a model of the type:

$\Delta P = f(Q\text{vol}, \text{mass of soot})$, with:

$\Delta P = P\text{upstream} - P\text{downstream}$, and $Q\text{vol} = K \times (Q\text{air} + \rho\text{fuel} \times Q\text{carb}) \times N \times T\text{upstream}/P\text{upstream}$, where:
Pupstream and Pdownstream are the pressures measured respectively upstream and downstream from the said particulate filter,
K is a constant,
Qair denotes the mass flow of air measured by a flowmeter,
pfuel denotes the density of the diesel fuel,
Qcarb denotes the volumetric quantity of diesel fuel injected into the said engine,
N denotes the rpm of the said engine, and
Tupstream denotes the absolute temperature measured upstream from the said particulate filter, characterized in that Pdownstream is modeled and in that Pupstream is determined by means of the relationship Pupstream=$\Delta$P+Pdownstream.

By virtue of these characteristics, merely the measurement of the differential pressure $\Delta$P is sufficient to determine when it is necessary to trigger regeneration of the particulate filter, so that it is possible to rely on a single pressure sensor.

The present invention also relates to a device for use of a method according to the foregoing, characterized in that it includes, as the sole pressure sensor, a differential pressure sensor intended to be mounted on the said particulate filter.

The present invention also relates to a motor vehicle, characterized in that it is equipped with a device according to the foregoing.

BRIEF DESCRIPTION OF THE DRAWING

Other characteristics and advantages of the present invention will become apparent upon reading the description hereinafter and upon examining the single FIGURE of the attached drawing, which schematically illustrates a device for use of the method according to the invention.

DETAILED DESCRIPTION OF THE PREFERRED EMBODIMENTS

This FIGURE illustrates a motor vehicle 1 provided with an engine 3 of diesel type, that is, running on diesel fuel, and with an exhaust line 5 equipped with a particulate filter 7.

The operation of engine 3 and of particulate filter 7 is supervised by a computer 9.

The operation of regeneration of particulate filter 7 comprises raising the temperature of the exhaust gases to bring about combustion of the soot inside the particulate filter using appropriate means for assisting regeneration.

The activation of these means for assisting regeneration is controlled by computer 9 according to a certain number of parameters, and especially the soot burden of the particulate filter.

The method used to manage these regeneration means includes a stage of recognition of the burden of particulate filter 7, based on a model of the type:

$\Delta P = f(Q\text{vol}, \text{mass of soot})$, with:

$\Delta P = P\text{upstream} - P\text{downstream}$, and $Q\text{vol} = K \times (Q\text{air} + \rho\text{fuel} \times Q\text{carb}) \times N \times T\text{upstream}/P\text{upstream}$, where:
Pupstream and Pdownstream are the pressures measured respectively upstream and downstream from the particulate filter,
K is a constant,
Qair denotes the mass flow of air measured by the flowmeter,
pfuel denotes the density of the diesel fuel,
Qcarb denotes the volumetric quantity of diesel fuel injected into engine 3,
N denotes the rpm of engine 3, and
Tupstream denotes the absolute temperature measured upstream from the particulate filter.

This model therefore assumes as known values both the differential pressure $\Delta$P at the ends of the particulate filter and the absolute pressure Pupstream upstream from this filter.

It is important that the information relating to $\Delta$P be as precise as possible: an appropriate differential pressure sensor 11 is therefore used to measure this differential pressure.

On the other hand, the requirements of precision relating to knowledge of the upstream pressure Pupstream are less strict: it is therefore possible to dispense with a measurement of this pressure and to replace it by a calculation model.

It has been found that, by modeling the downstream pressure Pdownstream and then using the relationship Pupstream=$\Delta$P+Pdownstream, there is obtained entirely sufficient precision for Pupstream.

By virtue of this model, it is possible to save on the upstream sensor and to manufacture, at lower cost, a device for use of the method for regeneration of the particulate filter.

Of course, the present invention is not limited to the embodiment described and illustrated, which embodiment is presented by way of an illustrative and non-limitative example.

The invention claimed is:

1. A method for regeneration of a particulate filter situated on an exhaust line of an engine, the method comprising determining a soot burden on the filter based on knowledge of a differential pressure ΔP at ends of the filter and of a pressure Pupstream upstream from the filter and triggering combustion of the soot when the burden reaches a predetermined level, wherein a pressure Pdownstream downstream from the filter is modeled without use of a pressure sensor and Pupstream is determined without use of a pressure sensor using the relationship Pupstream=ΔP+Pdownstream.

2. A method according to claim 1, wherein the burden is determined by the relationship:

$$\Delta P = f(Q\text{vol, mass of soot}), \text{ with:}$$

$$Q\text{vol} = K \times (Q\text{air} + \rho\text{fuel} \times Q\text{carb}) \times N \times T\text{upstream}/P\text{upstream, where:}$$

K is a constant,

Qair denotes a mass flow of air measured by a flowmeter,

ρfuel denotes a density of the fuel injected into the engine,

Qcarb denotes a volumetric quantity of fuel injected into the engine,

N denotes an rpm of the engine, and

Tupstream denotes an absolute temperature measured upstream from the filter.

3. A device for regeneration of a particulate filter situated on an exhaust line of an engine, the device comprising:

a differential pressure sensor configured to determine a differential pressure ΔP at ends of the filter; and a controller configured to determine a soot burden on the filter based on knowledge of the differential pressure ΔP and of a pressure Pupstream upstream from the filter and configured to trigger combustion of the soot when the burden reaches a predetermined level, wherein a pressure Pdownstream downstream from the filter is modeled without use of a pressure sensor and Pupstream is determined without use of a pressure sensor using the relationship Pupstream=ΔP+Pdownstream.

4. A device according to claim 3, wherein said controller is configured to determine the burden by the relationship:

$$\Delta P = f(Q\text{vol, mass of soot}), \text{ with:}$$

$$Q\text{vol} = K \times (Q\text{air} + \rho\text{fuel} \times Q\text{carb}) \times N \times T\text{upstream} / P\text{upstream, where:}$$

K is a constant,

Qair denotes a mass flow of air provided to the engine and measured by a flowmeter, ρfuel denotes a density of the fuel injected into the engine, Qcarb denotes a volumetric quantity of fuel injected into the engine, N denotes an rpm of the engine, and Tupstream denotes an absolute temperature measured upstream from the filter.

5. A motor vehicle comprising:

an engine having an exhaust line;

a particulate filter provided along said exhaust line; and a device configured to regenerate said particulate filter, said device comprising:

a differential pressure sensor configured to determine a differential pressure ΔP at ends of said filter, and a controller configured to determine a soot burden on said filter based on knowledge of the differential pressure ΔP and of a pressure Pupstream upstream from said filter and configured to trigger combustion of the soot when the burden reaches a predetermined level, wherein a pressure Pdownstream downstream from said filter is modeled without use of a pressure sensor and Pupstream is determined without use of a pressure sensor using the relationship Pupstream=ΔP+Pdownstream.

6. A motor vehicle according to claim 5, wherein said controller is configured to determine the burden by the relationship:

$$\Delta P = f(Q\text{vol, mass of soot}), \text{ with:}$$

$$Q\text{vol} = K \times (Q\text{air} + \rho\text{fuel} \times Q\text{carb}) \times N \times T\text{upstream}/P\text{upstream, where:}$$

K is a constant,

Qair denotes a mass flow of air provided to said engine and measured by a flowmeter, ρfuel denotes a density of the fuel injected into said engine, Qcarb denotes a volumetric quantity of fuel injected into said engine, N denotes an rpm of said engine, and Tupstream denotes an absolute temperature measured upstream from said filter.

* * * * *